(12) United States Patent
Yoon et al.

(10) Patent No.: US 10,714,080 B2
(45) Date of Patent: Jul. 14, 2020

(54) WFST DECODING SYSTEM, SPEECH RECOGNITION SYSTEM INCLUDING THE SAME AND METHOD FOR STORING WFST DATA

(71) Applicant: SAMSUNG ELECTRONICS CO., LTD., Suwon-si (KR)

(72) Inventors: Jae Sung Yoon, Yongin-si (KR); Jun Seok Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 89 days.

(21) Appl. No.: 15/699,487

(22) Filed: Sep. 8, 2017

(65) Prior Publication Data

US 2018/0233134 A1    Aug. 16, 2018

(30) Foreign Application Priority Data

Feb. 10, 2017 (KR) .......................... 10-2017-0018455

(51) Int. Cl.
| | |
|---|---|
| *G10L 15/08* | (2006.01) |
| *G10L 15/18* | (2013.01) |
| *G10L 15/193* | (2013.01) |
| *G10L 15/02* | (2006.01) |
| *G10L 15/22* | (2006.01) |
| *G10L 15/30* | (2013.01) |
| *G10L 15/187* | (2013.01) |

(52) U.S. Cl.
CPC ............ *G10L 15/193* (2013.01); *G10L 15/02* (2013.01); *G10L 15/22* (2013.01); *G10L 15/187* (2013.01); *G10L 15/30* (2013.01)

(58) Field of Classification Search
CPC ................................ G10L 15/08; G10L 15/18
USPC .......................................................... 704/240
See application file for complete search history.

(56) References Cited

U.S. PATENT DOCUMENTS

| 8,694,138 B2 | 4/2014 | Okubo et al. |
| 8,972,243 B1 | 3/2015 | Strom et al. |
| 9,558,743 B2 * | 1/2017 | Coccaro ............. G10L 15/1822 |
| 9,583,107 B2 * | 2/2017 | Terrell, II ............... G10L 15/01 |
| 9,613,619 B2 * | 4/2017 | Lev-Tov ................. G10L 15/01 |

(Continued)

FOREIGN PATENT DOCUMENTS

| JP | 9-319393 A | 12/1997 |
| JP | 2013-171214 A | 9/2013 |

(Continued)

*Primary Examiner* — Seong-Ah A Shin
(74) *Attorney, Agent, or Firm* — Sughrue Mion, PLLC

(57) ABSTRACT

A weighted finite-state transducer (WFST) decoding system is provided. The WFST decoding system includes a memory that stores WFST data and a WFST decoder including a data fetch logic. The WFST data has a structure including states, and arcs connecting the states with directivity. The WFST data is compressed in the memory. The WFST data includes body data, and header data including state information for each states that is aligned discontinuously. The body data includes arc information of the arcs that is aligned continuously. The state information includes an arc index of the arcs, a number of the arcs, and compression information of the arcs, and the data fetch logic de-compresses the WFST data using the compression information, and retrieves the WFST data from the memory.

20 Claims, 13 Drawing Sheets

(56) References Cited

U.S. PATENT DOCUMENTS

| | | | |
|---|---|---|---|
| 9,966,066 B1* | 5/2018 | Corfield | G10L 15/193 |
| 9,971,765 B2* | 5/2018 | Li | G10L 15/1815 |
| 9,973,450 B2* | 5/2018 | Jablokov | H04L 51/04 |
| 2016/0005397 A1 | 1/2016 | Larri et al. | |
| 2016/0093292 A1* | 3/2016 | Hofer | G10L 15/02 |
| | | | 704/240 |
| 2016/0300566 A1* | 10/2016 | Hofer | G10L 15/08 |
| 2017/0053646 A1* | 2/2017 | Watanabe | G10L 15/22 |
| 2017/0091169 A1* | 3/2017 | Bellegarda | G06F 16/353 |
| 2017/0154033 A1* | 6/2017 | Lee | G06F 40/274 |

FOREIGN PATENT DOCUMENTS

| | | |
|---|---|---|
| JP | 2015-45668 A | 3/2015 |
| JP | 2015-87555 A | 5/2015 |

* cited by examiner

FIG. 14

| StateID | State Info | | | |
|---|---|---|---|---|
| 0 | Arc Address, # Arcs | Enc Info | Arc (0~n) | Arc (0~m) |
| 1 | | | Arc (0)　Arc (0~k) | |
| 2 | | | | |
| 3 | ⋮ | ⋮ | ... | |
| i | | | | Arc (0) |
| | Header | | Body | |

WFST DECODING SYSTEM, SPEECH RECOGNITION SYSTEM INCLUDING THE SAME AND METHOD FOR STORING WFST DATA

CROSS-REFERENCE TO RELATED APPLICATION

This application claims priority from Korean Patent Application No. 10-2017-0018455 filed on Feb. 10, 2017 in the Korean Intellectual Property Office, and all the benefits accruing therefrom under 35 U.S.C. § 119, the contents of which are herein incorporated by reference in their entirety.

BACKGROUND

1. Technical Field

Systems, apparatuses, and methods consistent with the present disclosure relate to a weighted finite-state transducer (WFST) decoding system, a speech recognition system including the same and a method for storing WFST data.

2. Description of the Related Art

Recently, a weighted finite-state transducer (WFST) is widely used at a decoder stage of the speech recognition. WFST refers to a data structure in a form of a network collecting and optimizing therein information such as grammar, pronunciation, or the like used in speech recognition.

Because of the large size thereof, the WFST has to be stored in an external memory such as DRAM to allow hardware such as a mobile access point (AP) and so on to access the same. Meanwhile, because an external memory has a limited size in a mobile environment, it is beneficial to compress and store WFST, because the compression can reduce the required memory size and also reduce the bandwidth.

SUMMARY

It is an aspect to provide a WFST decoding system for decoding WFST data compressed into a small capacity.

It is another aspect to provide a speech recognition system using WFST data compressed into a small capacity.

It is yet another aspect to provide a method for storing WFST data compressed into a small capacity.

The present disclosure is not limited to those aspects set forth above and example embodiments other than those described herein will be clearly understood to a person skilled in the art from the following description.

According to an aspect of an exemplary embodiment, there is provided a weighted finite-state transducer (WFST) decoding system, comprising a memory configured to store WFST data; and a WFST decoder comprising a data fetch logic, wherein the WFST data has a structure including one or more states, and one or more arcs connecting the one or more states with directivity, the WFST data is compressed in the memory, the WFST data includes body data, and header data including state information for each of the one or more states that is aligned discontinuously, the body data includes arc information of the one or more arcs that is aligned continuously, the state information includes an arc index of the one or more arcs, a number of the one or more arcs, and compression information of the one or more arcs, and the data fetch logic is configured to de-compress the WFST data using the compression information, and retrieve the WFST data from the memory.

According to another aspect of an exemplary embodiment, there is provided a speech recognition system, comprising a voice sampling module configured to sample a speech into digital data; and a speech recognition module configured to extract a feature vector of the digital data, score the feature vector to form scored data, and derive sentence data from the scored data by referring to weighted finite-state transducer (WFST) data, wherein the speech recognition module comprises a WFST decoder configured to de-compress the WFST data and retrieve the WFST data from an external memory, and the WFST data has a structure that includes one or more states, and one or more arcs connecting the one or more states with directivity, the WFST data is compressed, the WFST data comprises header data including state information for each of the one or more states that is aligned discontinuously, and body data including arc information of the one or more arcs that is aligned continuously, and the state information comprises an arc index of the one or more arcs, a number of the one or more arcs, and compression information of the one or more arcs.

According to another aspect of an exemplary embodiment, there is provided a speech recognition system, comprising a data fetch logic configured to retrieve weighted finite-state transducer (WFST) data having a structure that includes one or more states, and one or more arcs connecting the one or more states with directivity, wherein the WFST data comprises header data including state information for each of the one or more states that is aligned discontinuously, and body data including arc information of the one or more arcs that is aligned continuously, wherein the state information comprises an arc index of the one or more arcs, a number of the one or more arcs, and compression information of the one or more arcs, and wherein the data fetch logic comprises a WFST de-compressor configured to de-compress the body data using the compression information, and an address control logic configured to derive an address of the body data using the arc index, the number of the one or more arcs, and the compression information of the one or more arcs; and a data processor configured to receive scored data and form re-scored data using the WFST data transmitted from the data fetch logic.

According to yet another aspect of an exemplary embodiment, there is provided a method for storing a weighted finite-state transducer (WFST) data having a structure that has one or more states, and one or more arcs connecting the one or more states with directivity. Header data and body data are separately stored. The header data comprises state information for the one or more states aligned discontinuously. The state information comprises an arc index of the one or more arcs that use the state as a starting point, a number of the one or more arcs, and compression information of the one or more arcs. The body data includes arc information of the one or more arcs aligned continuously. The arc information comprises one or more elements that comprise information about any of a next state, an input label, an output label, a graph cost and other information. Any element included in the compression information is not included in the body data.

BRIEF DESCRIPTION OF THE DRAWINGS

The above and other aspects will become more apparent to those of ordinary skill in the art by describing in detail exemplary embodiments thereof with reference to the accompanying drawings, in which:

FIG. 14 is a concept view provided to explain compression information of arc information of a speech recognition system and a WFST decoding system according to some exemplary embodiments.

DETAILED DESCRIPTION

Hereinafter, exemplary embodiments of a speech recognition system will be described with reference to FIGS. 1 to 3.

Figure 1:
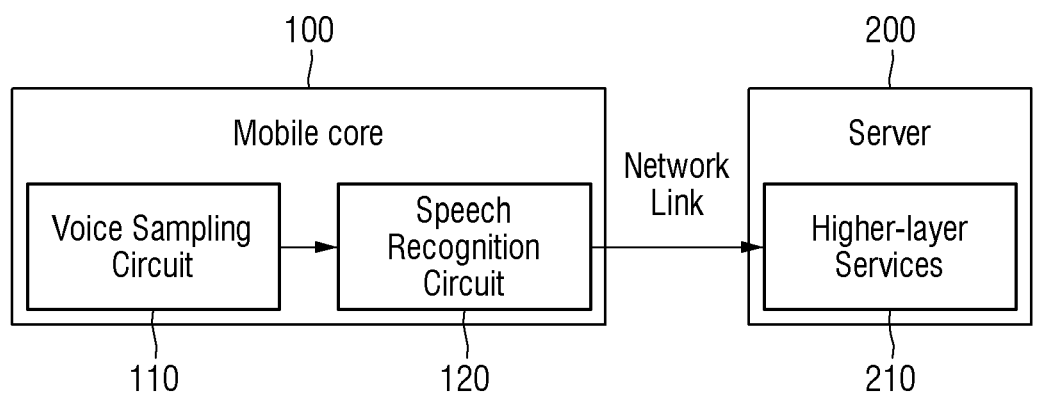
FIG. 1 is an exemplary block diagram of a speech recognition system according to some exemplary embodiments.
Figure 2:
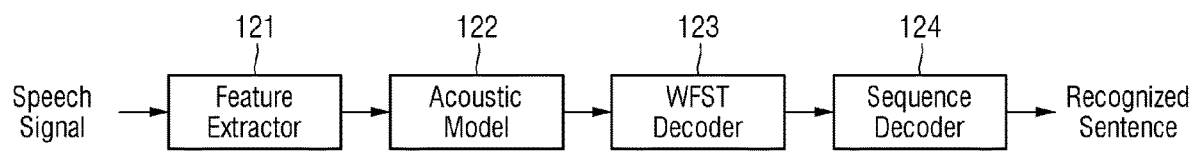
FIG. 2 is a block diagram provided to explain a detailed configuration of a speech recognition circuit of the speech recognition system of FIG. 1.

FIG. 1 is an exemplary block diagram provided to explain a speech recognition system according to some exemplary embodiments, and FIG. 2 is a block diagram provided to explain detailed configuration of a speech recognition circuit of the speech recognition system of FIG. 1. FIG. 3 is a block diagram provided to explain detailed configuration of a WFST decoder of the speech recognition circuit of FIG. 2.

Figure 3:
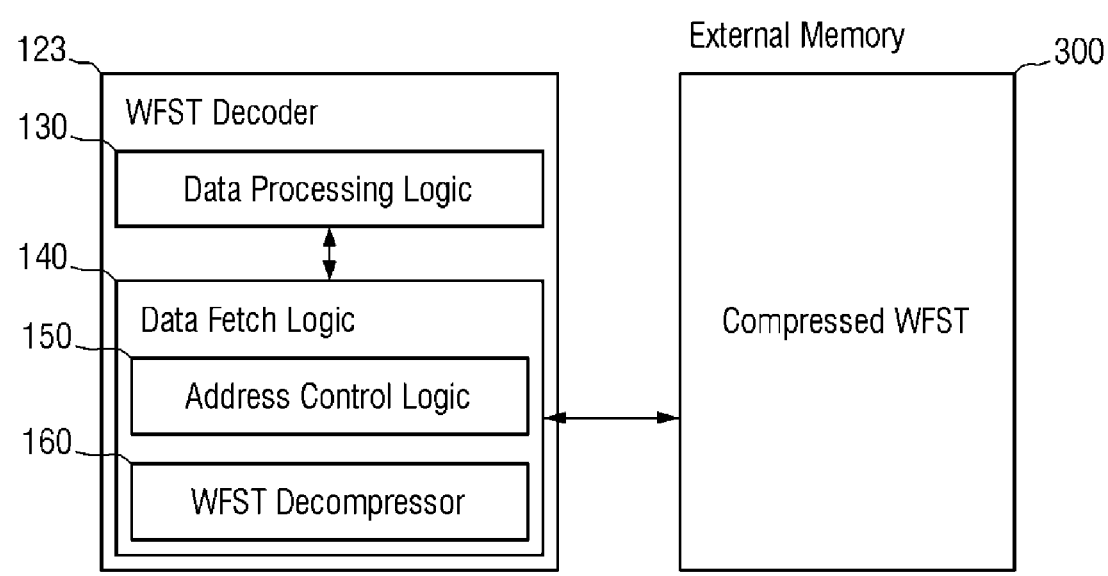
FIG. 3 is a block diagram provided to explain detailed configuration of a WFST decoder of the speech recognition circuit of FIG. 2.

Referring to FIGS. 1 to 3, the speech recognition system according to some exemplary embodiments may include a mobile core 100 and a server 200.

The mobile core 100 may represent a core portion of a mobile device. The mobile core 100 may be a portable device such as a cellular phone, a tablet PC, or the like. However, exemplary embodiments are not limited to the example given above. The mobile core 100 may include a microprocessor, a memory, and a bus connecting these.

The mobile core 100 may be spaced apart from the server 200. The mobile core 100 may be connected to the sever 200 by a network link.

The mobile core 100 may include a voice sampling circuit 110 and a speech recognition circuit 120.

The voice sampling circuit 110 may sample a human voice, i.e., speech, into digital data. That is, the voice sampling circuit 110 may receive as an input a human language using an external device such as a microphone, and output a digital signal. The voice sampling circuit 110 may transmit the digital data to the speech recognition circuit 120.

The speech recognition circuit 120 may receive the digital data from the voice sampling circuit 110. The speech recognition circuit 120 may perform speech recognition upon receiving the digital data. As a result, speech-recognized data, for example, sentence data, may be outputted. The sentence data may be transmitted to the server through the network link described above.

The sentence data may be a form of digital data converted from the content spoken by a human. That is, the sentence data may refer to a data form that is a result after the speech recognition is completed.

The server 200 may receive data after the speech recognition is completed. That is, the server 200 may receive sentence data wired or wirelessly from the mobile core 100. The sentence data may be utilized for higher-layer services 210.

The higher-layer services 210 may refer to a higher level of service, such as translation of a speech-recognized content, e.g., driving another device and performing a specific function according to the speech-recognized content. For example, in a remote condition such as ubiquitous computing, the speech recognition may send commands to another device on the network, or at a near distance, the speech-recognized content may be recorded in a data form or displayed to a user.

The higher-layer services 210 may not be limited to a specific form of service. That is, every type of service that is available with the utilization of the sentence data may be included in the higher-layer services 210.

Referring to FIG. 2, the speech recognition circuit 120 may include a feature extractor 121, an acoustic model 122, a WFST decoder 123, and a sequence decoder 124.

First, the feature extractor 121 may receive digital data (a speech signal) from the voice sampling circuit 110. The feature extractor 121 may extract a feature vector from the digital data. The feature vector may refer to each of constituent elements according to a language. In some exemplary embodiments, a feature vector may be provided for each of a plurality of constituent elements.

The constituent element may be a phrase defined by a word spacing as one of constituent elements of a sentence, or the constituent element may be a word, a syllable constructing a word, or a form of phoneme such as consonant and/or vowel constructing a syllable.

That is, in a sentence reading, "I'm going home," each of "I'm," "going," and "home" may be both the constituent element and the feature vector, or the word, "I," "am," "going," and "home" may each be the constituent element. Alternatively, the constituent elements may be divided into syllables, such as "go" and "ing." Alternatively, the constituent elements may be divided into phonemes, such as "g" and "o."

Extraction of the feature vectors may be performed by predetermined level and method, according to accuracy, difficulty, purpose and performance of the speech recognition.

The acoustic model 122 may score the constituent elements extracted as respective feature vectors. That is, because each person has his or her own voice and accent, the acoustic model 122 may represent the sound of each of the feature vectors of the sentence with a probability or a score.

For example, a vector pronounced as "I'm" may possibly be scored as 0.8 of probability of the vector being "I'm" and as 0.2 of probability of the vector being "Am". As a result, the accurate speech recognition may be performed by compensating the pronunciation that can be varied depending on attributes of each of the speakers.

The scoring method of the acoustic model 122 may be, for example, Gaussian Mixture Model (GMM) or Long Short Term Memory (LSTM), but not limited hereto.

The WFST decoder 123 may re-score the scored data and form re-scored data. The WFST decoder may re-score the scored data using previously stored WFST data such as a kind of library.

That is, the WFST data may check accuracy of a sentence using a rule or rules, such as grammar and/or pronunciation rules. That is, the WFST data may provide probabilities of "I'm going" being followed by "home" or "eat."

For example, the probability or the score may be provided such that 1.0 is provided for "home" and 0 for "eat." As a result, the scores designated with the existent acoustic model may be re-designed and recorded as more accurate scores.

The sequence decoder 124 may receive as an input the re-scored data and output sentence data. The sequence decoder 124 may complete a full sentence in a manner of checking an order of the sentence, and so on. However, according to some exemplary embodiments, the sequence decoder 124 may be omitted, and a completed sentence may be outputted by the WFST decoder 123.

Referring to FIG. 3, the WFST decoder 123 may include a data processing logic 130, and a data fetch logic 140.

The data processing logic 130 may receive as an input the scored data from the acoustic model 122. The data processing logic 130 may be provided with the WFST data from the data fetch logic 140. The data processing logic 130 may output the re-scored data using the scored data and the WFST data.

In an example, the re-scored data may derive a new score using cost of the scored data (i.e., score), and cost of the WFST data (i.e., score). In an example, a method for deriving a new score may use various methods such as an average value, a weighted average value, a median value, or the like. This method may be previously set suitably for the overall system performance and purpose.

The data fetch logic 140 may retrieve the WFST data from an external memory 300. In an example, the external memory 300 may be a volatile memory such as DRAM, but is not limited hereto.

The data fetch logic 140 may include an address control logic 150 and a WFST de-compressor 160.

The address control logic 150 may find an address of a body using address information recorded on a header of the WFST data. This will be explained in detail below.

The WFST de-compressor 160 may restore a compressed form of the WFST data back into the original form. That is, considering a large size of the WFST, it may be necessary that the WFST data is compressed and stored. Accordingly, the WFST data may be divided into header data and body data, and stored. This will be explained in detail below.

Further, data size of the WFST data may be minimized by compressing a portion that can be compressed, which may lead to a reduction of capacity necessary for the memory and a reduction of bandwidths.

The WFST de-compressor 160 may restore the WFST data from the compressed state back into the original form. As a result, the data processing logic 130 may help to facilitate a re-scoring operation.

Although it is described above that the WFST decoder 123 is a sub-structure of a speech recognition system, exemplary embodiments are not limited hereto. That is, in addition to being used for the speech recognition system, the WFST decoder 123 may be used as a WFST decoding system serving to restore the compressed WFST to an original state. In the above case, the data processing logic 130 may not necessarily perform re-scoring, but perform other operations by using the WFST data.

Hereinbelow, the operation of the data fetch logic 140 or the speech recognition system or the WFST decoding system according to some exemplary embodiments will be described with reference to FIGS. 4 to 6.

Figure 4:
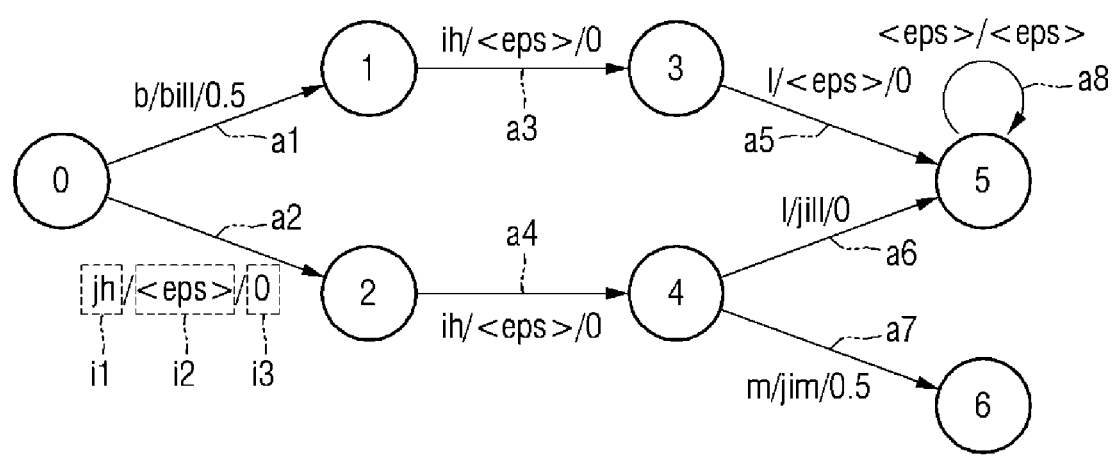
FIG. 4 is an exemplary view provided to explain a WFST data structure of the speech recognition system according to some exemplary embodiments.

FIG. 4 is an exemplary view provided to explain a WFST data structure of the speech recognition system according to some exemplary embodiments.

The WFST data structure may include one or more states, and arcs connecting the respective states.

The one or more states are indicated as 0-6 in FIG. 4. State 0 may be moved to State 1 or State 2 in response to a certain input. Arrows connecting respective states with directivity are defined by arcs a1-a8.

One state can be a starting point. There may be a singular arc or a plurality of arcs a1-a8. The 'starting point' as used herein may refer to a state in which the arcs a1-a8 start, and the 'destination' herein may refer to a state in which the arcs a1-a8 arrive. For example, a starting point of the first arc a1 may be State 0 and a destination thereof may be State 1.

In some cases, an arc may relate to only one state. That is, an arc might return to the state in which is started. For example, an arc of the arcs a1-a8 may have a starting point that is the same as a destination. For example, the eighth arc a8 in FIG. 4 has the starting point that is the same as the destination at State 5.

Figure 5:
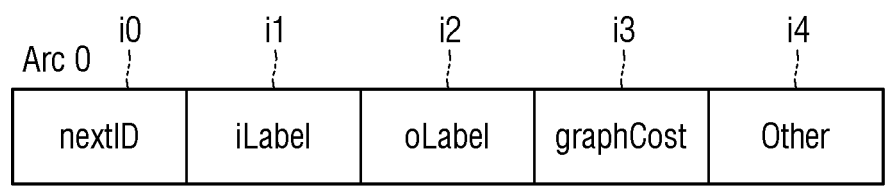
FIG. 5 is an exemplary view provided to explain arc information of a speech recognition system and a WFST decoding system according to some exemplary embodiments.

FIG. 5 is an exemplary view provided to explain arc information of a speech recognition system and a WFST decoding system according to some exemplary embodiments.

Referring to FIGS. 4 and 5, each of the arcs a1-a8 may include arc information i0-i4. The arc information i0-i4 may include a plurality of elements.

That is, the arc information i0-i4 may include elements of a next state (nextID) i0, an input label (iLabel) i1, an output label (oLabel) i2, a graph cost (graphCost) i3, and other information (other) i4.

The next state i0 may refer to a destination of the arc a1-a8. That is, the next state i0 of the first arc a1 may be State 1. In some cases, the next state i0 may be the same as the current state, as described above.

The input label i1 may refer to a feature vector which is previously inputted. The output label i2 may be the next constituent element that may follow the input label i1, and the output label i2 may be previously recorded in the WFST data. In FIG. 4, for the first arc a1, "b" may be the input label i1, and "bill" may be the output label i2.

Referring back to the example described above, "I," "am," "going," "home" may be respectively the input label i1 of each state, and "I'm going home" may be regarded as the output label i2 of one of the states.

The graph cost i3 may indicate the probability, the score, or the cost described above. That is, for the State 0, the probability, the score, or the cost may be 0.5 that the input label i1 "b" enters State 0 and exits to the next State 1 through the first arc a1.

"<eps>" of FIG. 4 may be an indication of a specific number such as "0" or "−1." Because "<esp>" is generally used to indicate that there is none, "<esp>" may appear in the WFST structure very frequently. In the example described above, "I'm going home" is the output label of one of several states, and accordingly, the other states do not have the output label and are expressed as "<esp>". In the speech recognition system or the WFST decoding system according to some exemplary embodiments, "<eps>" may be expressed by a number such as "0," "−1," or the like according to purpose and performance of the system.

The other information i4 may be additional information other than the information described above. For example, the other information i4 may include information as to whether sentence ends or not. Although the other information i4 consists of one item in FIG. 5, exemplary embodiments are not limited hereto. That is, the other information i4 may include of various items.

Figure 6:
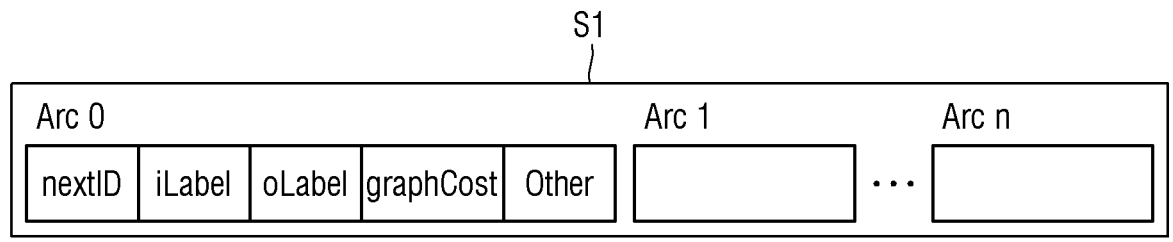
FIG. 6 is an exemplary view provided to explain a group of arc information having a same state as a starting point in a speech recognition system and a WFST decoding system according to some exemplary embodiments.

FIG. 6 is an exemplary view provided to explain a group of arc information having the same state as a starting point in a speech recognition system and a WFST decoding system according to some exemplary embodiments.

The arcs Arc 0 to Arc n may be grouped. That is, the arcs Arc 0 to Arc n having the identical state as the starting point may be defined to belong to a same group. FIG. 6 illustrates an example of a first group S1 based on an assumption that there are (n+1) arcs Arc 0 to Arc n having State 0 as a starting point.

Each of the arcs Arc 0 to Arc n may respectively include five elements as shown in FIG. 5. It should be noted that for convenience of description, the five elements are illustrated in the first arc Arc 0, while the five elements in the second to (n+1)th arcs Arc 1 to Arc n are not illustrated in FIG. 6.

Figure 7:
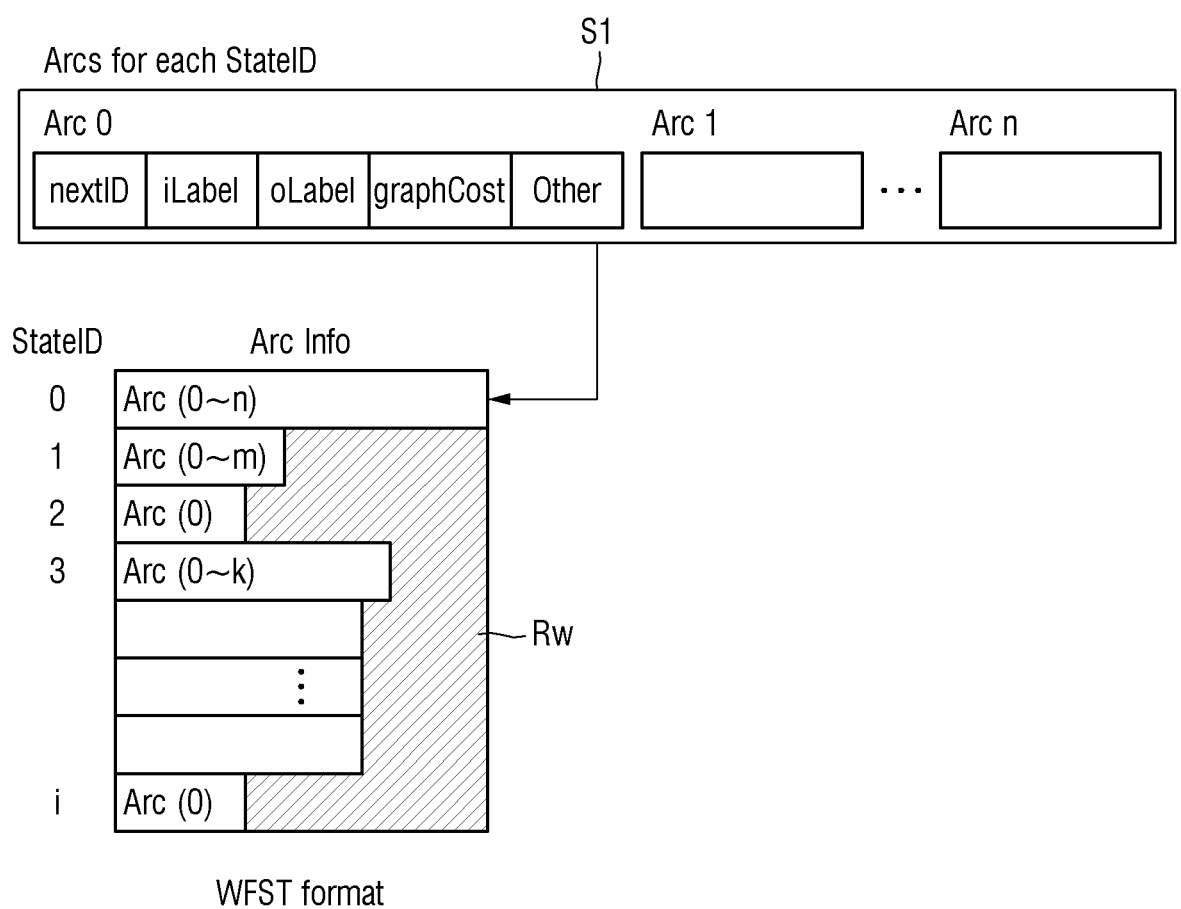
FIGS. 7 and 8 are exemplary views provided to explain a method for storing arc information of a speech recognition system and a WFST decoding system according to some exemplary embodiments.
Figure 8:
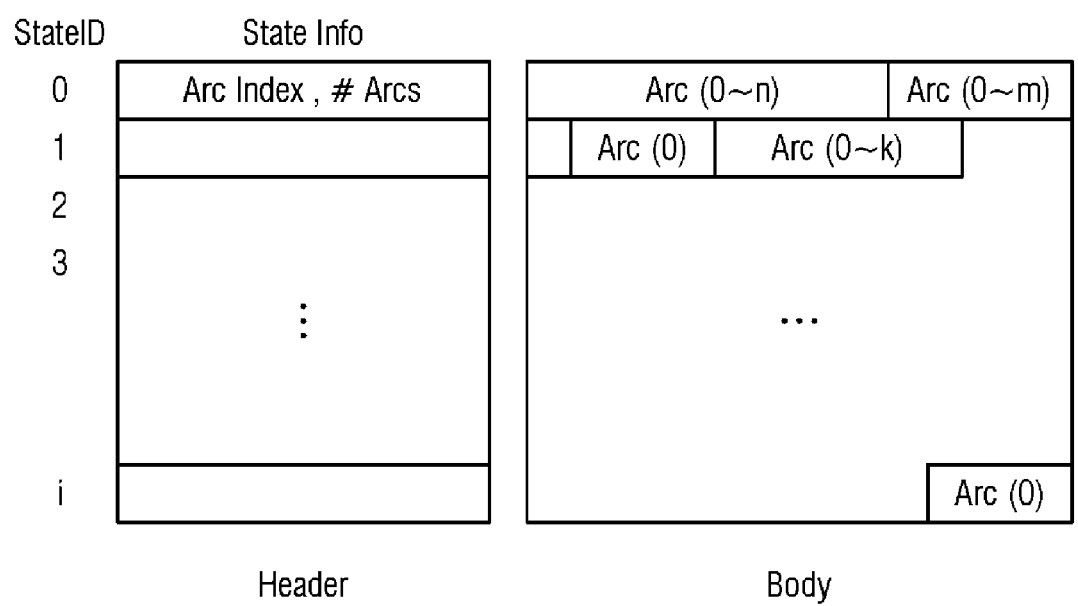

FIGS. 7 and 8 are exemplary views provided to explain a method for storing arc information of a speech recognition system and a WFST decoding system according to some exemplary embodiments.

First, referring to FIG. 7, because the arcs Arc 0 to Arc n of the first group S1 are the arcs Arc 0 to Arc n with State 0, the arcs Arc 0 to Arc n may be aligned and stored in State 0, and the groups of the arcs from State 1 to State i may each be discontinuously aligned and stored.

The expression "discontinuously" as used herein indicates that the next data does not follow immediately after an end of the previous data, thus meaning that data is sorted per state and stored.

In the above case, because a size of each arc may be fixed and the number of arcs may be varied by state, a waste region Rw may be formed. That is, as each data is stored discontinuously rather than continuously, the waste region may be formed, and accordingly, a size of a memory may further be increased. As a result, speed of the overall system may deteriorate, and more capacity for the memory may be necessary.

Accordingly, the WFST decoding system or the speech recognition system according to some exemplary embodiments may store the WFST data with a different method.

Referring to FIG. 8, the WFST data may include header data and body data.

The header data are respectively aligned per state. The header data may store state information including an Arc Index and a number of arcs, in which the arcs are the arcs that correspond to each state, i.e., the arcs that have the state as the starting point. In an example, the Arc Index of the arcs may refer to an address of the memory, or more precisely, an address of a first arc. Because a size of an arc is fixed and the number of arcs is also included in the state information, location of each arc may be easily obtained. That is, the location of each arc may be calculated with the address control logic 150 of FIG. 3 using the Arc Index and the number of arcs.

The body data may have the arc information of the arcs per state continuously stored therein. The term "continuous" as used herein indicates that next arc information is stored immediately after a previous arc information seamlessly, in contrast to an example where the arc information is aligned per state. Of course, the arcs of the same group may be stored adjacently, thus allowing calculation of locations thereof by the address control logic 150 of FIG. 3.

Figure 9:
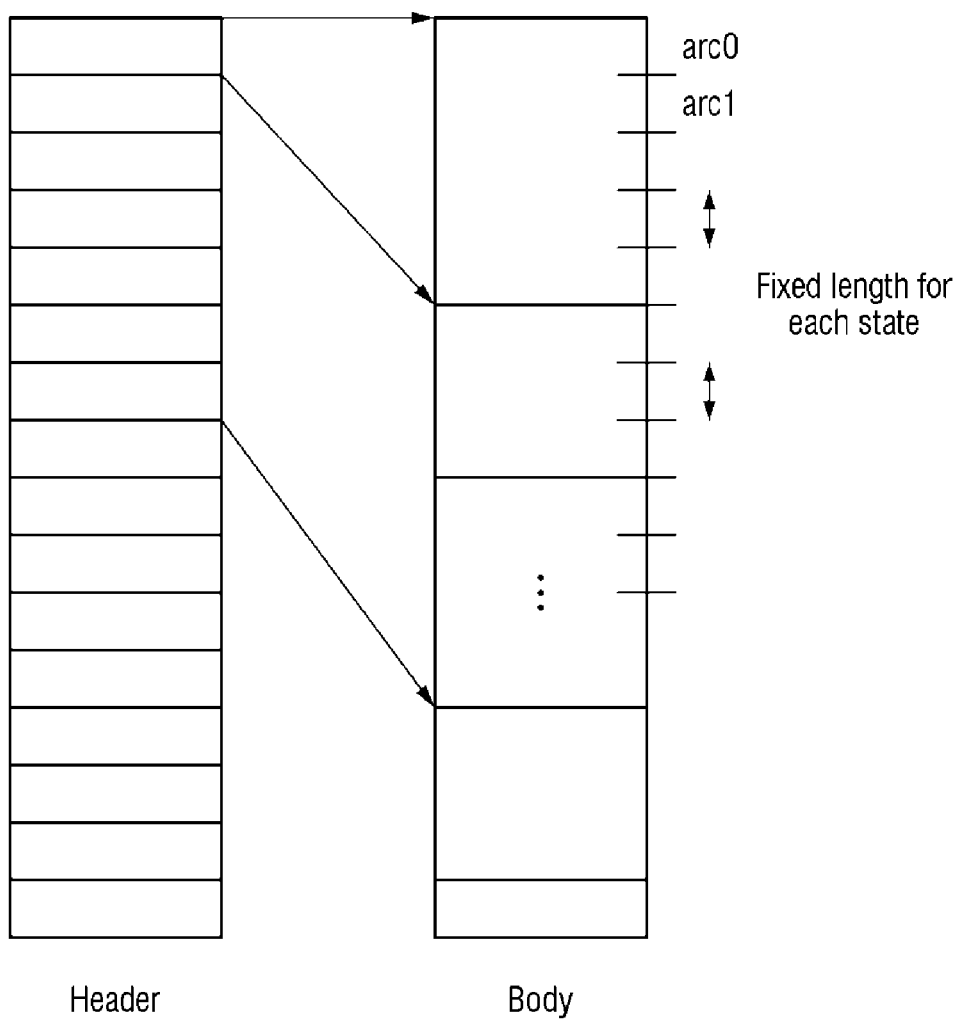
FIG. 9 is a concept view provided to explain a method for loading arc information of a speech recognition system and a WFST decoding system according to some exemplary embodiments.

FIG. 9 is a concept view provided to explain a method for loading arc information of a speech recognition system and a WFST decoding system according to some exemplary embodiments.

Referring to FIGS. 8 and 9, although the header data may be stored discontinuously, because the Arc Indexes of the arcs and the number of the arcs included in the header data are stored respectively with the same size, no region in the header data is wasted. Further, because the body data is continuously stored, no region in the body data is wasted. Accordingly, the overall WFST data may be stored with efficiency. In other words, in exemplary embodiments, the waste region Rw shown in FIG. 7 may be eliminated.

The address control logic of FIG. 3 may obtain an address of first arc information using an address of the first arc of each state (e.g., the Arc Index), and may obtain an address of arc information of the other arcs using a bit width and the number of the arcs of the previously fixed arc information.

Hereinbelow, a compressing method of a WFST decoding system or a speech recognition system according to some exemplary embodiments will be described below with reference to FIG. 10.

Figure 10:
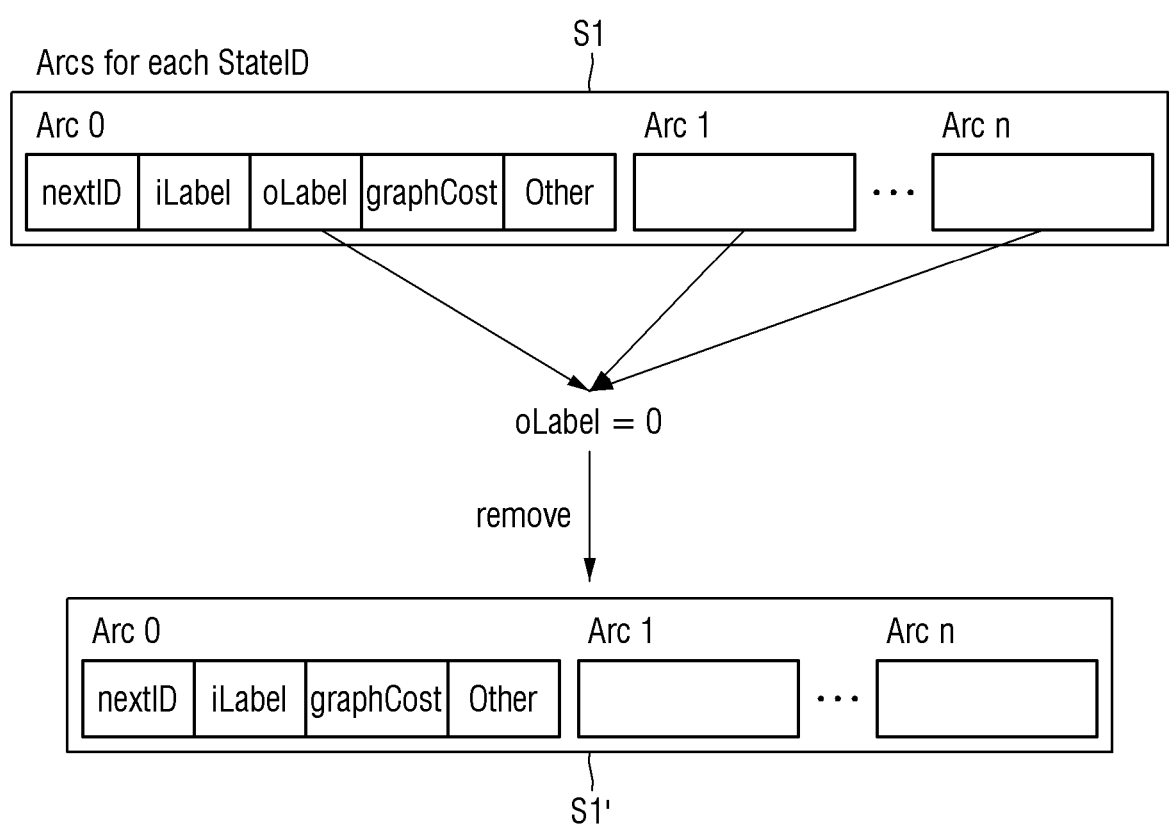
FIG. 10 is a concept view provided to explain a method for compressing arc information in a speech recognition system and a WFST decoding system according to some exemplary embodiments.

FIG. 10 is a concept view provided to explain a method for compressing arc information in a speech recognition system and a WFST decoding system according to some exemplary embodiments.

Referring to FIG. 10, when the output labels (oLabel) of the arc information in the first group S1 have an identical value in all of the arcs Arc 0 to Arc n, the output labels (oLabel) may be omitted from the body data.

That is, in a first compression group S1', the arc information of all of the arcs Arc 0 to Arc n may express the next state (next ID), the input label (iLabel), the graph cost (graphCost) and the other information (other) only. That is, in such a way, the size of the arc information may be reduced, and the size of the body data may be reduced accordingly. As a result, compression of the entire WFST data may be performed.

When the output label (oLabel) is removed from the body data, the compression history may be recorded in the compression information of the header data. Accordingly, the WFST de-compressor 160 of FIG. 3 may later restore the output label (oLabel) of the body data using the compression information in the header data.

Although FIG. 10 exemplifies the output label (oLabel), exemplary embodiments are not limited hereto. That is, any of the input label (iLabel), the graph cost (graphCost) and the other information (other) may be removed when the element meets the condition described above, i.e., that all the arcs of the same group have an identical value at an identical element.

Specifically, as a non-positive value such as "0" or "−1" is frequently used in a structure like the WFST data used in the speech recognition, for example as described above with respect to "<eps>" in FIG. 4, the compression may occur frequently and high efficiency may be obtained.

Hereinbelow, a compressing method of a WFST decoding system or a speech recognition system according to some exemplary embodiments will be described below with reference to FIG. 11.

Figure 11:
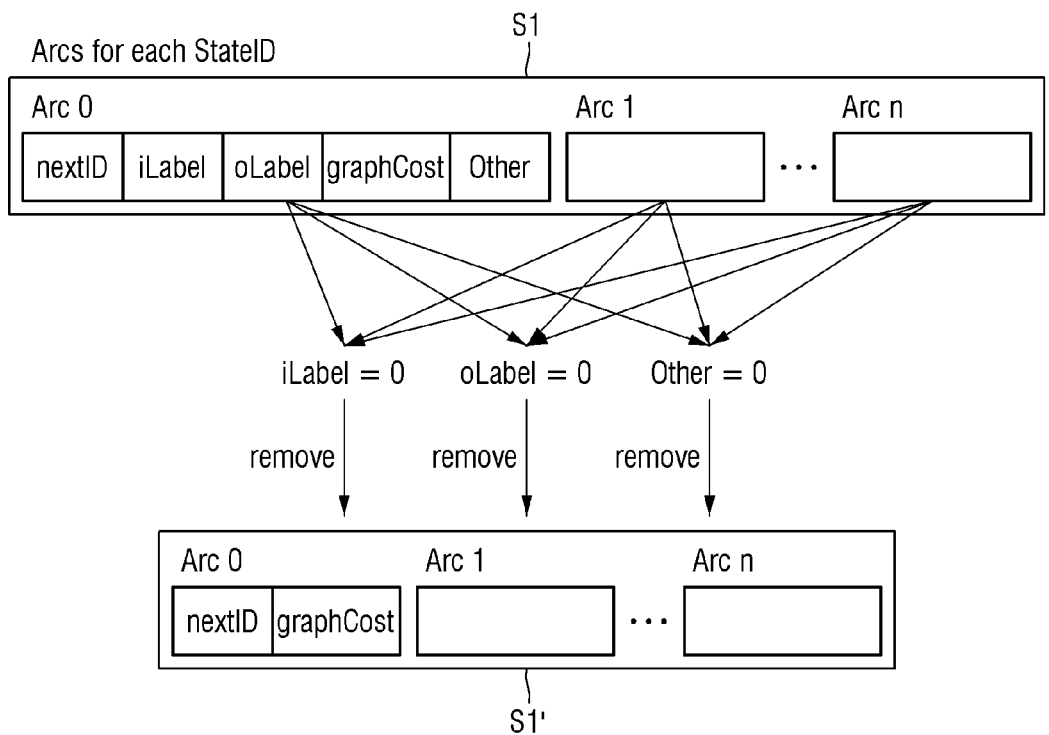
FIG. 11 is a concept view provided to explain a method for compressing arc information in a speech recognition system and a WFST decoding system according to some exemplary embodiments.

FIG. 11 is a concept view provided to explain a method for compressing arc information in a speech recognition system and a WFST decoding system according to some exemplary embodiments.

Referring to FIG. 11, when the input label (iLabel), the output label (oLabel), and the other information (other) of the arc information within the first group S1 respectively have an identical value in all of the arcs Arc 0 to Arc n, these may be removed from the body data.

That is, in the first compression group S1', the arc information in all of the arcs 0-n may express the next state (nextID) and the graph cost (graphCost) only. That is, in such a way, the size of the arc information may be reduced, and the size of the body data may be reduced accordingly. As a result, compression of the entire WFST data may be performed.

When the output label (oLabel) is removed from the body data, the compression history may be recorded in the compression information of the header data. Accordingly, the WFST de-compressor 160 of FIG. 3 may later restore the output label (oLabel) of the body data using the compression information in the header data.

FIG. 11 illustrates three elements that are removed, but exemplary embodiments are not limited hereto. That is, a plurality of elements may be compressed and the number of the elements is not limited.

Although FIG. 11 illustrates the input label (iLabel), the output label (oLabel), and the other information (other) are removed, exemplary embodiments are not limited hereto.

Hereinbelow, the compressing method of the WFST decoding system or the speech recognition system according to some exemplary embodiments will be described below with reference to FIG. 12.

Figure 12:
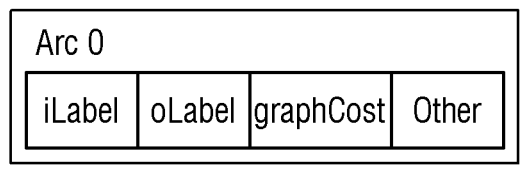
FIG. 12 is a concept view provided to explain a method for compressing arc information in a speech recognition system and a WFST decoding system according to some exemplary embodiments.

FIG. 12 is a concept view provided to explain a method for compressing arc information in a speech recognition system and a WFST decoding system according to some exemplary embodiments.

Referring to FIG. 12, when the next state (nextID) is identical to the current state in all of the arcs Arc 0 to Arc n of the first group S1, the next state (nextID) may be removed from the body data.

That is, the arc information in all of the arcs Arc 0 to Arc n may only express the input label (iLabel), the output label (oLabel), the graph cost (graphCost), and the other information (other) only, i.e., while excluding the next state (nextID). That is, in such a way, the size of the arc information may be reduced, and the size of the body data may be reduced accordingly. As a result, compression of the entire WFST data may be performed.

In this case, since the next state (nextID) has a value of the current state in all of the arcs Arc 0 to Arc n, it may thus be considered that all arcs have the same value as shown in the example of FIG. 10. Of course, the value in this case may not be "0" or "−1."

When the next state (nextID) is removed from the body data, the compression history may be recorded in the compression information of the header data. Accordingly, the WFST de-compressor 160 of FIG. 3 may later restore the output label (oLabel) of the body data using the compression information in the header data.

Hereinbelow, a compressing method of a WFST decoding system or a speech recognition system according to some exemplary embodiments will be described below with reference to FIG. 13.

Figure 13:
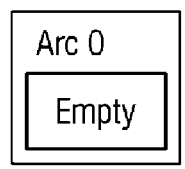
FIG. 13 is a concept view provided to explain a method for compressing arc information in a speech recognition system and a WFST decoding system according to some exemplary embodiments.

FIG. 13 is a concept view provided to explain a method for compressing arc information in a speech recognition system and a WFST decoding system according to some exemplary embodiments.

Referring to FIG. 13, when the next state (nextID) is the same as the current state in all of the arcs Arc 0 to Arc n of the first group S1, and when the input label (iLabel), the output label (oLabel), the graph cost (graphCost), and the other information (other) are the same as each other, all the elements may be removed from the body data.

In this case, the body data may be completely empty, and all the information may be recorded in the header data.

That is, the arc information may not be recorded at all in any of the arcs Arc 0 to Arc n. As a result, it is possible to compress considerably a large amount of data.

Hereinbelow, the compression information of the WFST decoding system or the speech recognition system according to some exemplary embodiments will be described below with reference to FIGS. 10 to 14.

FIG. 14 is a concept view provided to explain compression information of arc information of a speech recognition system and a WFST decoding system according to some exemplary embodiments.

Referring to FIGS. 10 and 14, the header data may include compression information (Enc Info). For example, the compression information may consist of 5 bits corresponding to the next state (nextID), the input label (iLabel), the output label (oLabel), the graph cost (graphCost), and the other information (other). However, the configuration of the compression information (Enc Info) may be varied when the configuration of the arc information is varied.

When only the output label (oLabel) is compressed as in FIG. 10, the compression information (Enc Info) may be recorded as "00100." This value may indicate that only the output label (oLabel) is compressed, while the other elements remain uncompressed. Of course, the corresponding output label (oLabel) may not be stored in the body data.

Referring to FIGS. 11 and 14, when the input label (iLabel), the output label (oLabel), and the other information (other) are compressed as in FIG. 11, the compression information (Enc Info) may be recorded as "01101." This value may indicate that the input label (iLabel), the output label (oLabel), and the other information (other) are compressed, while the other elements remain uncompressed. Of course, the corresponding input label (iLabel), output label (oLabel), and other information (other) may not be stored in the body data.

Referring to FIGS. 12 and 14, when the next state (nextID) is compressed as in FIG. 12, the compression information (Enc Info) may be recorded as "10000." This value may indicate that the next state (nextID) is compressed while the other elements remain uncompressed. Of course, the corresponding next state (nextID) may not be stored in the body data.

Referring to FIGS. 13 and 14, when all the elements of the next state (nextID), the input label (iLabel), the output label (oLabel), the graph cost (graphCost), and the other information (other) are compressed as in FIG. 13, the compression information (Enc Info) may be recorded as "11111." This value may indicate that all the elements are compressed. As a result, all the elements of corresponding next state (nextID), the input label (iLabel), the output label (oLabel), the graph cost (graphCost), and the other information (Etc.) may not be stored in the body data.

Hereinbelow, the compressing method of the WFST decoding system or the speech recognition system according to some exemplary embodiments will be described below with reference to FIG. 15.

Figure 15:
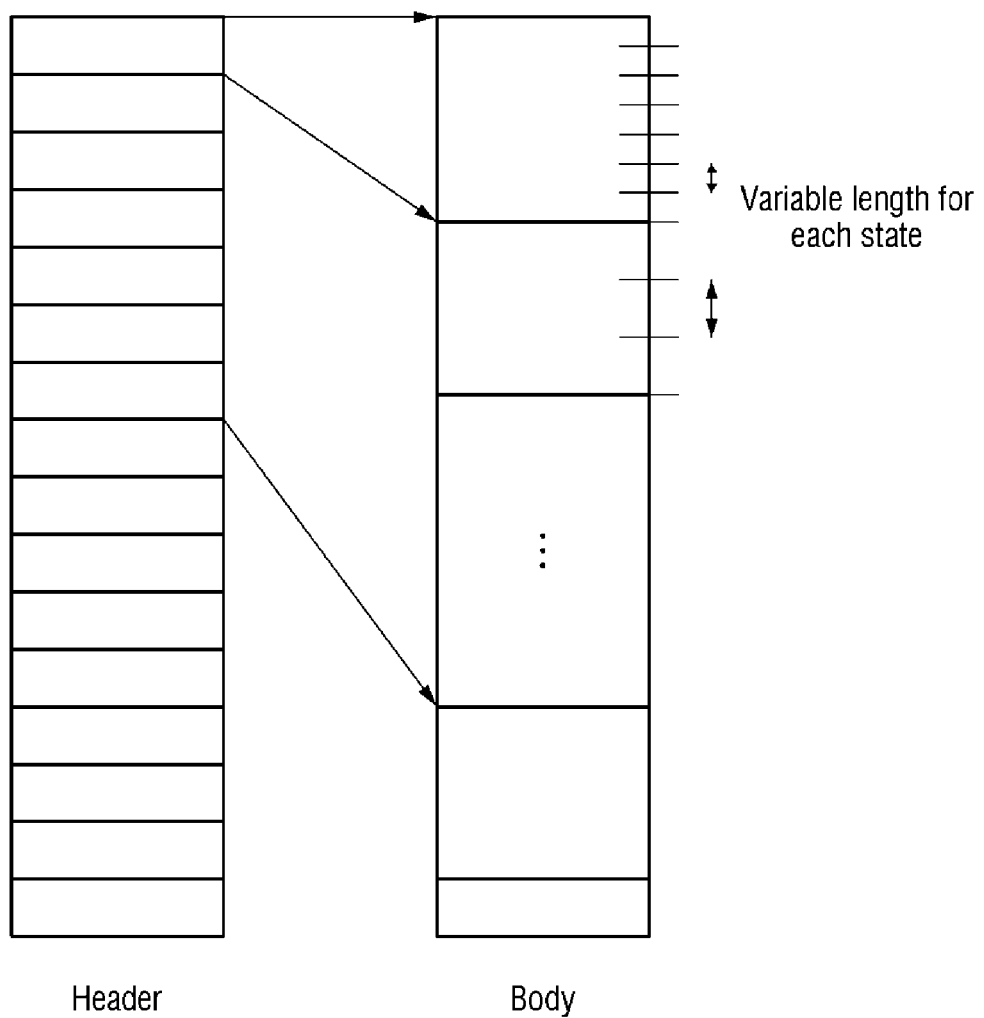
FIG. 15 is a concept view provided to explain a method for loading arc information of a speech recognition system and a WFST decoding system according to some exemplary embodiments.

FIG. 15 is a concept view provided to explain a method for loading arc information of a speech recognition system and a WFST decoding system according to some exemplary embodiments.

Referring to FIG. 15, although the header data may be stored discontinuously, because the indexes of the arcs (i.e., the Arc Index) and the number of the arcs are stored respectively with the same size, no region is wasted. Further, because the body data is continuously stored, no region is wasted. Accordingly, the overall WFST data may be stored with efficiency.

Additionally, since the data is compressed per state, respectively, the overall size of the body data may be greatly reduced. In an example, since each compression is performed per state, the bit widths of the arc information per state may be varied from one another.

Hereinbelow, a method for storing WFST data according to some exemplary embodiments will be described below with reference to FIGS. 1 to 6 and 10 to 15.

First, a speech recognition method will be described with reference to FIGS. 1 to 3. The method for storing WFST data of the present disclosure may be included in the speech recognition method, or may be provided separately.

First, referring to FIG. 1, the voice sampling circuit 110 may sample a human sound such as speech into digital data. That is, the voice sampling circuit 110 may receive as an input a human language using an external device such as a microphone, and output a digital signal. The voice sampling circuit 110 may transmit the digital data to the speech recognition circuit 120.

Then, the speech recognition circuit 120 may receive the digital data from the voice sampling circuit 110. The speech recognition circuit 120 may perform speech recognition upon receiving the digital data. As a result, the speech-recognized sentence data may be outputted.

Specifically, referring to FIG. 2, the feature extractor 121 may receive the digital data (speech signal) from the voice sampling circuit 110. The feature extractor 121 may extract a feature vector from the digital data. The feature vector may refer to each of constituent elements according to language.

Next, the acoustic model 122 may score the constituent element extracted as each feature vector. That is, because each person has his or her own voice and accent, the acoustic model 122 may represent the sound of each of the feature vectors of the sentence with a probability or a score.

Next, the WFST decoder 123 may re-score the scored data and form the re-scored data. The WFST decoder may re-score the scored data using previously stored WFST data such as a kind of library.

According to the speech recognition method described above, the WFST decoder 123 may decode the WFST data which is compressed and stored in the external memory 300. Hereinbelow, a method for compressing and storing the WFST data in the external memory 300 will be described below.

First, referring to FIGS. 10 to 14, the method may include determining if the same element of all the arcs Arc 0 to Arc n has an identical value in a group of the arcs having the same state as a starting point, and if so, form the respective compression information (Enc Info) thereof.

In an example, when the next state (nextID) has the same value as a current state, the compression information (Enc Info) may be formed.

Specifically, referring to FIGS. 10 and 14, the header data may include the compression information (Enc Info). For example, the compression information may consist of 5 bits corresponding to the next state (nextID), the input label (iLabel), the output label (oLabel), the graph cost (graphCost), and the other information (other). However, the configuration of the compression information (Enc Info) may be varied when the configuration of the arc information is varied.

When only the output label (oLabel) is compressed as in FIG. 10, the compression information (Enc Info) may be recorded as "00100." This value may indicate that only the output label (oLabel) is compressed, while the other elements remain uncompressed. Of course, the corresponding output label (oLabel) may not be stored in the body data.

Referring to FIGS. 11 and 14, when the input label (iLabel), the output label (oLabel), and the other information (other) are compressed as in FIG. 11, the compression information (Enc Info) may be recorded as "01101." This value may indicate that the input label (iLabel), the output label (oLabel), and the other information (other) are compressed, while the other elements remain uncompressed. Of course, the corresponding input label (iLabel), output label (oLabel), and other information (other) may not be stored in the body data.

Referring to FIGS. 12 and 14, when the next state (nextID) is compressed as in FIG. 12, the compression information (Enc Info) may be recorded as "10000." This value may indicate that the next state (nextID) is compressed while the other elements remain uncompressed. Of course, the corresponding next state (nextID) may not be stored in the body data.

Referring to FIGS. 13 and 14, when all the elements of the next state (nextID), the input label (iLabel), the output label (oLabel), the graph cost (graphCost), and the other information (other) are compressed as in FIG. 13, the compression information (Enc Info) may be recorded as "11111." This value may indicate that all the elements are compressed. As a result, all the elements of corresponding next state (nextID), input label (iLabel), output label (oLabel), graph cost (graphCost), and other information (other) may not be stored in the body data.

The compressed WFST data may be loaded by the WFST decoder 123.

Specifically, referring to FIG. 3, the data fetch logic 140 may retrieve the WFST data from the external memory 300. The WFST de-compressor 160 may restore the WFST data from the compressed state back into the original form. As a result, the data processing logic 130 may help to facilitate a re-scoring operation.

In an example, the address control logic 150 may find an address of the body using the address information recorded in the header of the WFST data.

Next, the data processing logic 130 may receive as an input the scored data from the acoustic model 122. The data processing logic 130 may be provided with the WFST data from the data fetch logic 140. The data processing logic 130 may output the re-scored data using the scored data and the WFST data.

Then, the sequence decoder 124 may receive as an input the re-scored data and output sentence data. The sequence decoder 124 may complete a full sentence in a manner of checking an order of the sentence, and so on. However, according to some exemplary embodiments, the sequence decoder 124 may be omitted, and a completed sentence may be outputted by the WFST decoder 123.

Then, the server 200 may receive data after the speech recognition is completed. That is, the server 200 may receive sentence data wired or wirelessly from the mobile core 100. The sentence data may be utilized for a higher level of service.

The higher-layer services 210 may be a higher level of service that may refer to translation of a speech-recognized content, e.g., driving another device and performing a specific function according to the speech-recognized content. For example, in a remote condition such as ubiquitous computing, the speech recognition may send commands to another device on the network, or at a near distance, the speech-recognized content may be recorded in a data form or displayed to a user.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present exemplary embodiments be considered in all respects as illustrative and not restrictive, reference being made to the appended claims rather than the foregoing description to indicate the scope of the present disclosure.

What is claimed is:

1. A weighted finite-state transducer (WFST) decoding system, comprising:
   a memory configured to store WFST data; and
   a WFST decoder circuit comprising a data fetch logic,
   wherein the WFST data has a structure including one or more states, and one or more arcs connecting the one or more states with directivity,
   the WFST data is compressed in the memory, and includes body data and header data,
   the header data includes an arc index of the one or more arcs, a number of the one or more arcs, and compression information of the one or more arcs, the header data being aligned per state and stored in the memory discontinuously,
   the body data includes, for each of the one or more arcs, one or more elements, the body data being continuously stored in the memory,
   the compression information comprises one or more bits corresponding respectively to the one or more elements, each bit indicating for a respective element whether or not the respective element is compressed, and
   the data fetch logic is configured to de-compress the WFST data using the compression information, and retrieve the WFST data from the memory.

2. The weighted finite-state transducer decoding system of claim 1, wherein the one or more elements comprise information on a next state, an input label, an output label and a graph cost.

3. The weighted finite-state transducer decoding system of claim 2, wherein the body data omits any element that is indicated by the compression information as being compressed.

4. The weighted finite-state transducer decoding system of claim 2, wherein, for one or more arcs of which the same state is a starting point, when the one or more arcs have identical values for at least one element of the input label, the output label and the graph cost, the at least one element for which the one or more arcs have identical values is compressed.

5. The weighted finite-state transducer decoding system of claim 2, wherein, for one or more arcs of which the same state is a starting point, when a current state and a next state are identical in all of the one or more arcs, the next state is compressed.

6. The weighted finite-state transducer decoding system of claim 1, wherein, for a first arc and a second arc of which different states are a starting point, sizes of bit widths of the first arc and the second arc are different from each other.

7. The weighted finite-state transducer decoding system of claim 1, wherein, for one or more arcs of which the same state is a starting point, sizes of bit widths are the same as each other.

8. The weighted finite-state transducer decoding system of claim 1, wherein the data fetch logic comprises:
   a WFST de-compressor configured to de-compress the WFST data; and
   an address control logic configured to calculate an address of the body data based on the header data.

9. The weighted finite-state transducer decoding system of claim 1, wherein the WFST decoder circuit further comprises a data processing logic configured to receive the WFST data retrieved by the data fetch logic, and configured to derive output data using input data.

10. The weighted finite-state transducer decoding system of claim 9, wherein the input data comprises speech recognition data.

11. A speech recognition system, comprising:
    a voice sampling circuit configured to sample a speech into digital data; and
    a speech recognition circuit configured to extract a feature vector of the digital data, score the feature vector to form scored data, and derive sentence data from the scored data by referring to weighted finite-state transducer (WFST) data,
    wherein the speech recognition circuit comprises a WFST decoder circuit configured to de-compress the WFST data and retrieve the WFST data from an external memory, and
    the WFST data has a structure that includes one or more states, and one or more arcs connecting the one or more states with directivity,
    the WFST data is compressed, and includes body data and header data,
    the header data includes an arc index of the one or more arcs, a number of the one or more arcs, and compression information of the one or more arcs, the header data being aligned per state and stored in the external memory discontinuously,
    the body data includes, for each of the one or more arcs, one or more elements, the body data being continuously stored in the external memory
    the compression information comprises one or more bits corresponding respectively to the one or more elements, each bit indicating for a respective element whether or not the respective element is compressed, and the body data omits any element that is indicated by the compression information as being compressed.

12. The speech recognition system of claim 11, wherein the speech recognition circuit comprises a feature extracting circuit configured to receive the digital data and extract the feature vector, and
an acoustic model configured to score the feature vector to derive the scored data, and
the WFST decoder circuit configured to re-score the scored data with reference to the WFST data to form re-scored data.

13. The speech recognition system of claim 12, further comprising a sequence decoder configured to receive the re-scored data and derive the sentence data.

14. The speech recognition system of claim 11, further comprising a server configured to receive sentence data from the speech recognition circuit.

15. The speech recognition system of claim 14, wherein the server is spaced apart from the voice sampling circuit and the speech recognition circuit, and connected via a network.

16. A speech recognition system, comprising:
a data fetch logic circuit configured to retrieve weighted finite-state transducer (WFST) data having a structure that includes one or more states, and one or more arcs connecting the one or more states with directivity,
wherein the WFST data comprises header data including an arc index of the one or more arcs, a number of the one or more arcs, and compression information of the one or more arcs, the header data being aligned per state and stored discontinuously, and body data including, for each of the one or more arcs, one or more elements, the body data being stored continuously,
wherein the compression information comprises one or more bits corresponding respectively to the one or more elements, each bit indicating for a respective element whether or not the respective element is compressed, and
wherein the data fetch logic circuit comprises a WFST de-compressor configured to decompress the body data using the compression information, and an address control logic configured to derive an address of the body data using the arc index, the number of the one or more arcs, and the compression information of the one or more arcs; and
a data processor configured to receive scored data and form re-scored data using the WFST data transmitted from the data fetch logic circuit.

17. The speech recognition system of claim 16, wherein the scored data comprises scores according to pronunciation.

18. The speech recognition system of claim 16, wherein the re-scored data comprises scores according to pronunciation and grammar.

19. The speech recognition system of claim 16, wherein the one or more elements comprise information about a next state, an input label, an output label and a graph cost.

20. The speech recognition system of claim 19, wherein the body data omits any element that is indicated by the compression information as being compressed.

* * * * *